Oct. 13, 1953      P. R. LEE      2,655,621
CONTROL APPARATUS
Filed Oct. 15, 1949
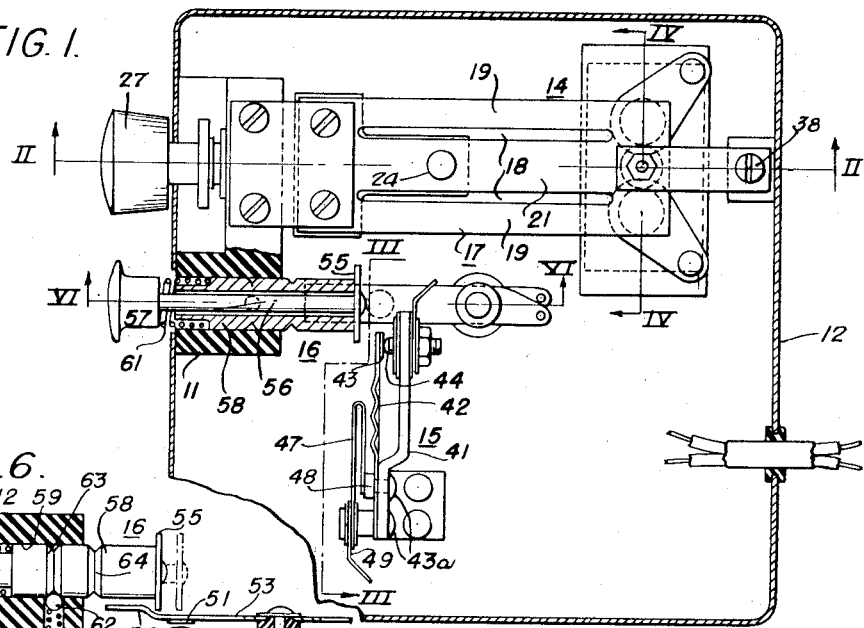
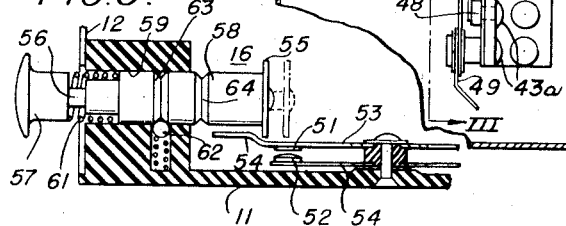
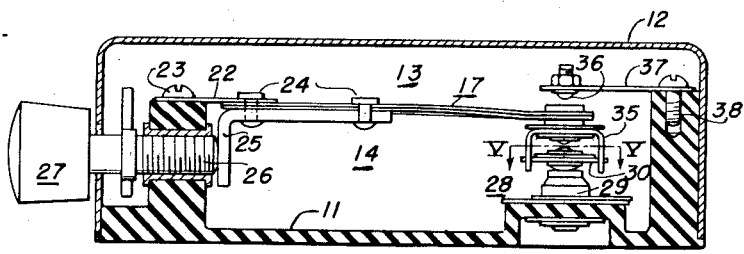
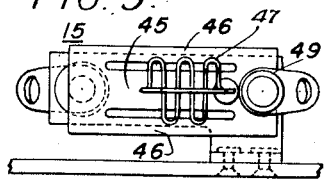
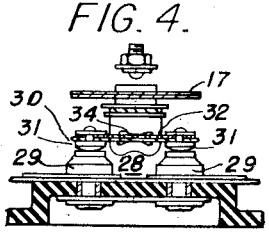
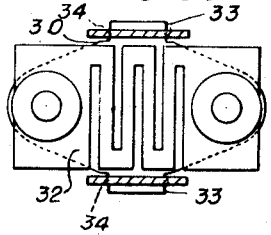
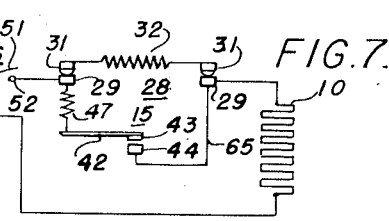
INVENTOR
PAUL R. LEE
BY
ATTORNEY Patented Oct. 13, 1953

2,655,621

UNITED STATES PATENT OFFICE 2,655,621

CONTROL APPARATUS

Paul R. Lee, Mansfield, Ohio, assignor to Westinghouse Electric Corporation, East Pittsburgh, Pa., a corporation of Pennsylvania Application October 15, 1949, Serial No. 121,555

2 Claims. (Cl. 317—132)

My invention relates to control apparatus and has for an object to provide improved apparatus of this kind.

A further object of the invention is to provide an improved control mechanism for cyclically energizing and deenergizing an electrical translating device such as, for example, an electrically heated bed covering, the periods of energization of the controlled device being varied, inversely, in response to changes in temperature of the ambient atmosphere.

A further object of the invention is to prolong one or more of the early periods of energization of the controlled device when initiating operation thereof in order that the device may rapidly be heated from a cold state to its proper operating temperature, after which preheating, the mechanism is automatically adjusted to provide a reduced rate of energization of the device which is sufficient to maintain the device at its proper operating temperature for the prevailing ambient air temperature.

In controlling electrically heated bed coverings, such as, electrically heated sheets, it has been the practice to employ a control device having a switch which alternately opens and closes the circuit of the sheet. This switch is actuated by a heat-responsive element, such as, a bimetal member which is subjected to the temperature of the ambient atmosphere. During closed positions of the switch, the bimetal member is subjected to heat provided by a control heater which is also controlled by the switch. The bimetal member when heated by the heater to a predetermined degree snaps the switch to its open position for deenergizing the heater and the sheet and, upon cooling of the bimetal member to a predetermined lower temperature, closing of the switch is effected for again energizing the sheet and the control heater. The rate of heating and cooling of the bimetal is a function of ambient air temperature and, therefore, the temperature of the sheet may vary, inversely, with changes in said air temperature.

I have found, in initiating operation of apparatus of this kind from a cold state, that the first cycles of the switch occur before the temperature of the sheet has been increased to the value to be maintained. This condition, known as "undertravelling" of the control, is overcome by the present invention which contemplates a reduction in the amount of heat imparted to the bimetal by its control heater during one or more of the initial cycles, and, therefore, the period or period sof time that the cycling switch is closed for energization of the sheet are increased. At the conclusion of this preheating period, the control heater is automatically adjusted to impart its proper or normal amount of heat to the bimetal whereupon a predetermined rate of energization of the sheet is initiated to maintain the sheet at proper temperature. The reduction in heat produced by the control heater and imparted to the bimetal is carried out by diverting a portion of the current from the heater under control, preferably, of a timing switch structure. The latter may include a bimetal member, a heater and a switch actuated by the bimetal member and controlling the heater. The timing switch structure is manually closed and thermostatically opened by its bimetal member.

The foregoing and other objects are effected by my invention as will be apparent from the following description and claims taken in connection with the accompanying drawings, forming a part of this application, in which:

Fig. 1 is a plan view of my improved control mechanism with certain parts thereof broken away for the sake of clearness;

Figs. 2, 3 and 4 are sectional views taken along the respective lines II—II, III—III and IV—IV of Fig. 1;

Fig. 5 is a sectional view taken along the line V—V of Fig. 2;

Fig. 6 is a sectional view taken along the line VI—VI of Fig. 1; and,

Fig. 7 is a diagram of electrical connections between the control elements and a heater to be controlled.

Reference will now be had to the drawing wherein I have elected to disclose my improved control mechanism applied for controlling the energization of a heating element 10 (Fig. 7) of an electrically heated bed covering (not shown). Referring now to Figs. 1 to 6, inclusive, the control device includes a base 11 and a cupped cover 12 secured thereto in any suitable manner and defining a compartment 13 therewithin. Arranged within the compartment 13 are a primary cycling switch structure, indicated generally at 14, a secondary or timing switch construction, indicated generally at 15, and a line switch structure indicated generally at 16.

The primary switch structure 14 is thermostatically actuated and includes a heat responsive bimetal element 17 of any well understood construction. The element 17 disclosed is rectangular in configuration and provided with a pair of slots 18 extending longitudinally thereof for defining a pair of end connected outer legs 19 and an inner leg 21. The outer legs 19 may be crimped or deformed in order to impart a comparative stress to the inner leg 21, whereby the element 17 snaps from one position to another upon heating and cooling, all of which is well understood. The element 17 is supported at one end by a flat spring 22 which is secured to the base by screws 23 and to the bimetal element 17 by a plurality of rivets 24. The rivets 24 also serve to secure an abutment 25 to the bimetal element 17 which abutment 25 is engageable with an adjusting screw 26 having a handle 27 secured thereto exteriorly of the cover 12.

The opposite or free end of the bimetal element 17 actuates a primary switch 28, the latter including a pair of stationary contacts 29 which are secured to and insulated from the base 11 in any suitable manner. The primary switch 28 includes a pair of movable contacts 31 which are engageable with the stationary contacts 29 and which are supported by a contact plate 30 formed of insulating material or metal having an insulating finish, such as anodized aluminum. The movable contacts 31 are electrically connected together with a heater 32 which, during closed positions of the primary switch 28 imparts heat to the bimetal 17. The contact plate 30 preferably includes a pair of tabs 33 which are disposed in openings 34 formed, respectively, in end portions of a yoke 35. The latter is secured to and insulated from the free or movable end of the bimetal 17 in any suitable manner. Upward or switch-opening movement of the bimetal 17 is limited by an adjustable stop 36 carried by a support 37, the latter being secured to the base 11 in any suitable manner, such as, by means of a screw 38.

The operation of a cycling switch of the type shown at 14 is well understood in the art. Briefly stated, however, the heater 32 is energized when the switch 28 is closed and heats the bimetal element 17 to a temperature at which the element 17 snaps upwardly into engagement with the stop 36 whereupon the switch 28 is opened. The heater 32 is then deenergized and the element 17 cools to a lower temperature and snaps to its switch-closed position, as shown, and the cycle is repeated. The bimetal element 17 is subjected to ambient air temperature and the rate of heating and cooling of the element are a function of the ambient air temperature. The ratio between the period of time that the switch 28 is closed to the period of time that the switch 28 is open vary, inversely, with variations in room temperature. Therefore, the rate of energization of the device being controlled increases and decreases respectively with decreases and increases in room temperature. The adjustment handle 27 is provided for varying the stresses in the bimetal element 17 and the temperatures at which the latter operates to open and close the switch 28. Accordingly, the temperature of the controlled device may be varied relative the temperature of the ambient atmosphere.

The timing switch structure 15 preferably includes a bracket 41 secured to the base 11 and insulated therefrom in any well understood manner. A snap-acting bimetal element 42 has one of its ends secured to the bracket 41 by rivets 43a, the opposite end of the bimetal element 42 carrying a movable contact 43. The latter is engageable with a stationary contact 44 carried by the bracket 41 and suitably insulated therefrom. The bimetal element 42 may be similar in construction to the element 17 and includes an inner leg 45 and outer legs 46 best shown in Fig. 3. The outer legs 46 are crimped, as shown in Fig. 1, in order to compress the inner leg 45 and, therefore, the element 42 moves between two positions with a snap action. A heater shown at 47 is disposed in heat-transfer relation with the bimetal element 42 and has one terminal electrically connected to the bimetal element as shown at 48, the opposite terminal 49 of the heater being supported by and insulated from the bracket 41.

Operation of the control device is initiated and terminated by a line switch structure 16 which is best shown in Figs. 1 and 6. The line switch structure 16 includes a movable contact 51 and a relatively stationary contact 52 which are carried by respective spring supports 53 and 54. The latter supports 53 and 54 are carried by the base 11 and insulated therefrom in any suitable manner. The spring support 53 biases the contact 51 away from the contact 52 at all times. As shown, the spring support 53 is provided with a raised portion 54 which is engageable with a camming disc 55 when the latter is moved to the left from the position shown in Fig. 6. This movement of the camming disc 55 forces the movable contact 51 into engagement with the contact 52.

The camming disc 55 is fixed to a stem 56 having a handle 57 secured thereto exteriorly of the cover 12. As best shown in Fig. 1, the stem 56 is slidable axially in a sleeve 58, the latter being movable axially within an opening 59 formed in the base 11. The handle 57, the stem 56 and the camming disc 55 are biased to the left, as shown in the drawings, by a compression spring 61 which is interposed between the handle 57 and the sleeve 58. The purpose of the spring 61 and the reason for the axial movement of the camming disc 55 relative to the sleeve 58 will be set forth hereinafter. The sleeve 58 is retained in its switch closed and switch open positions by means of a spring pressed ball 62 which is received by grooves 63 and 64, formed on the outer surface of the sleeve 58. As shown in the drawing, the spring pressed ball 62 is disposed in the groove 63 so that the sleeve is retained in its switch open position. When the handle 57 is moved to the left, from the position shown in Fig. 6, the sloping side walls of the grooves 63 first force the ball 62 downwardly and then the sleeve 68 is free to move to the left until the ball 63 enters the groove 64. During this movement the camming disc 55 engages the portion 54 of spring support 53 and forces the contact 51 into engagement with the contact 52.

As set forth heretofore, the contacts 43 and 44 of the timing switch 15 are manually closed and are opened by the heating of the bimetal 42. Preferably, the contacts 43 and 44 are closed when the line switch structure 16 is moved to its off position to terminate heating of the element 10 under control. Accordingly, the apparatus is preset for a succeeding operation which is initiated by moving the line switch 16 to its closed position. The camming disc 55 is employed for forcing the bimetal 42 and the contact 43 to the switch closed positions thereof when the line switch is moved to its open position. In moving the line switch from its closed to its open position, pressure on the knob 57 to the right, as shown in Fig. 6, will compress the spring 61 and engage the inner surface of the knob 57 with the end of the sleeve 58. The sleeve 58 will then move to the right to open the line switch contacts 51 and 52, as described, and, due to the fact that the spring 61 is compressed, the camming disc 55 will assume the position shown in dot and dash lines in Fig. 6. During this opening movement of the line switch, as described, the camming disc 55 engages the end of the bimetal 42 and forces it to the position shown in Fig. 1 wherein the contacts 43 and 44 are engaged. When the operator removes pressure from the knob 57, the spring 61 will expand and the line switch structure will assume the position shown in full lines in Fig. 6. The purpose of this operation of the line switch and the timing switch 15 will become apparent as the description proceeds.

As shown in Fig. 7, the source of power for the control mechanism and the element 10 is represented by line conductors L1 and L2 which usually is a 115 volt lighting circuit. As shown, one terminal of the main heating element 10 under control is directly connected to the line conductor L2 while the opposite terminal thereof is electrically connected to one of the main fixed contacts 29. The opposite fixed contact 29 connects through the line switch structure 16 to the line conductor L1. It will be apparent that when the line switch structure 16 is closed and the contacts 31 engage their respective contacts 29, a circuit is formed wherein the control heater 32 and the heating element 10 are connected in series. The heater 47 of the timing switch 15 has one terminal connected to one of the contacts 29 and the opposite terminal connected with the movable contact 43 through the bimetal element 42. The stationary contact 44 of the timing switch 15 is connected by means of a conductor 65 to the other stationary contact 29 of the cycling switch 28. It will be apparent from the foregoing that the heating element 47, the bimetal 42, the contacts 43 and 44 and the conductor 65 define a shunt across the heater 32 in the closed position of the cycling switch 28 and, therefore, divert a portion of the current from the heater 32 of the cycling switch.

Heretofore, electrically heated bed coverings have been controlled by a cycling switch of the type shown generally at 14 and employing a cycling heater which must be designed to properly time the periods of energization of the bed covering once the latter is heated to its proper operating temperature. When operation of such apparatus is started from a cold condition, this cycling heater will operate to open the control switch prematurely or before the bed covering is heated to its proper operating temperature. Depending upon the capacity of the cycling heater, the control switch may be operated several times before the temperature of the bed covering is increased to its proper temperature after which a substantially constant temperature of the bed covering is maintained for a given ambient air temperature. This delay in heating the bed covering is overcome by the control mechanism disclosed herein, the operation of which will now be described.

Operation

The positions of the various elements of the control, as shown in the drawing, are the positions prevailing when the apparatus is inactive. The line switch 16 is open and the cycling switch 28 is closed due to the fact that the bimetal 17 is relatively cool or at room temperature. The timing switch 15 is closed because, as described heretofore, closure of the timing switch 15 is effected when the line switch 16 is opened to terminate a prior operation of the apparatus.

In order to initiate operation of the mechanism the handle 57 is withdrawn to the left, as viewed in Fig. 6, for closing the contacts 51 and 52 of the line switch 16. Accordingly, current flows from the line conductor L1 through the line switch 16 to the cycling switch structure 28. A portion of the current passes through the heater 32 of the cycling switch and a second portion passes through the shunt circuit defined by the heater 47 and the closed contacts 43 and 44 of the timing switch 15. The combined current flows through the main heating element 10 of the bed covering into the other line conductor L2. Due to the fact that a substantial portion of the current is diverted from the heater 32, its heating effect is reduced and, therefore, the opening of the contacts of the cycling switch 28 is delayed and the period of energization of the main heating element 10 is prolonged. After a predetermined period of time has elapsed during which the heater 47 increases the temperature of the bimetal 42 to its operating temperature, the contacts 43 and 44 are disengaged whereupon the shunt circuit across the contacts 29 of the cycling switch 28 and heater 32 is opened. Accordingly, the total amount of current flowing through the main heating element 10 passes through the control heater 32 and the additional heat imparted to the bimetal 17 effects opening of the cycling switch 28. The period of time that the shunt circuit is closed for prolonging the period of energization of the main heater 10 is predetermined by the design of the timing switch structure 15 and is such that heating of the bed covering to its proper operating temperature is effected.

As set forth heretofore, the timing switch structure 15 is ineffective to close its contacts 43 and 44 upon cooling so that, for the remainder of the period of operation of the bed covering, the contacts 43 and 44 remain open and the periods of energization of the main heating element 10 is solely controlled by the cycling switch structure 14.

In order to terminate operation of the apparatus, the line switch 16 is moved to its open position as described heretofore and it will be recalled that during this operation of the line switch 16, the camming disc 55 engages the bimetal 42 and forces it to the position shown in the drawing wherein the contacts 43 and 44 are closed. Accordingly, the timing switch 15 is preset for a subsequent operation of the apparatus.

In the described operation of the present control apparatus, the timing switch 15 is operated to disengage the contacts 43 and 44 and open the shunt across the heater 32 before the main cycling switch 14 operates to disengage contacts 29—31. To provide this operation, the resistance of the heater 47 is relatively low as compared to the resistance of the heater 32 and, therefore, a large percentage of the current is shunted from the heater 32. This operation may, if desired, be modified by varying the ratio of the resistance of the heaters 32 and 47. By increasing the resistance of heater 47 and reducing the resistance of heater 32 an operation is effected wherein the cycling switch 28 is opened and closed a number of times before the heater 47 effects disengagement of contacts 43 and 44. It will be noted that, with the latter operation, the main element 10 continues to be energized, at a reduced rate after opening of the cycling switch, in series with the heater 47, bimetal element 42, the closed contacts 43 and 44 and conductor 65. Accordingly, the continuous energization of the heating element 10 is effective to rapidly heat the element 10 and the bed covering even though the switch 28 is cycled during this heating up period. Regardless of the timing of operation of the switch 15, the heating of the element 10 and the bed covering from room air temperature to the desired operating temperature is facilitated.

From the foregoing description, it will be apparent that I have provided an improved control mechanism for an electrically heated device, such as, a bed covering which mechanism has a cycling switch responsive to ambient air temperature for controlling energization of the bed covering and wherein the period or periods of energization of the bed covering are prolonged when operation of the apparatus is started from a cold condition. This operation is provided without the addition of any manually operated adjusting handles and is automatically provided by usual manipulations of the control necessary to start operation of the controlled device. While I have shown a timing switch structure which is adjusted to its active position by the line switch upon opening of the latter, it will be understood that the timing switch may be rendered active upon closing the line switch.

While I have shown my invention in but one form, it will be obvious to those skilled in the art that it is not so limited, but is susceptible of various changes and modifications without departing from the spirit thereof.

What I claim is:

1. In control apparatus, the combination of a primary switch having a pair of stationary contacts and a pair of movable contacts engageable, respectively, with the stationary contacts, a bimetal member for engaging and disengaging said movable and stationary contacts, a heater bridging said movable contacts and disposed in heat-transfer relation with said bimetal member, a line switch connected in series with said primary switch, a secondary switch, a second bimetal member, operative, when heated to open said secondary switch but ineffective when cooled to close the secondary switch, a heater connected in series with the secondary switch for heating said second bimetal member, said serially connected heater and secondary switch being connected in shunt across the stationary contacts of said primary switch and means responsive to movement of said line switch to its open position for closing said secondary switch.

2. In control apparatus, the combination of a cycling switch, a heat responsive element for opening and closing said switch, a primary heater connected in series with said switch and disposed in heat transfer relation with said element, a second switch, a second heat responsive element for opening said second switch, a second heater connected in series with said second switch and disposed in heat transfer relation with the second heat responsive means, means connecting said serially connected second heater and second switch in parallel with said primary heater, and manually operated means for closing said second switch to shunt a portion of the primary heater current through said second heater to prolong the cycle of operation of said cycling switch.

PAUL R. LEE.

References Cited in the file of this patent.

UNITED STATES PATENTS

| Number | Name | Date |
| --- | --- | --- |
| 2,023,114 | Biebel | Dec. 3, 1935 |
| 2,046,718 | Bletz | July 7, 1936 |
| 2,195,958 | Kearsley | Apr. 2, 1940 |
| 2,383,291 | Cook | Aug. 21, 1945 |
| 2,410,013 | Clark | Oct. 29, 1946 |
| 2,426,906 | Vaughan | Sept. 2, 1947 |
| 2,539,179 | Bevis et al. | Jan. 23, 1951 |
| 2,598,081 | Sway | May 27, 1952 |